(12) United States Patent
Moll et al.

(10) Patent No.: US 11,525,631 B2
(45) Date of Patent: Dec. 13, 2022

(54) DEVICE FOR CONTROLLING THE TEMPERATURE OF OBJECTS

(71) Applicant: EISENMANN SE, Böblingen (DE)

(72) Inventors: Mathias Moll, Weil im Schönbuch (DE); Harald Sonner, Sindelfingen (DE)

(73) Assignee: EISENMANN GMBH, Böblingen (DE)

( * ) Notice: Subject to any disclaimer, the term of this patent is extended or adjusted under 35 U.S.C. 154(b) by 0 days.

(21) Appl. No.: 16/471,642

(22) PCT Filed: Dec. 7, 2017

(86) PCT No.: PCT/EP2017/081919
§ 371 (c)(1),
(2) Date: Jun. 20, 2019

(87) PCT Pub. No.: WO2018/114375
PCT Pub. Date: Jun. 28, 2018

(65) Prior Publication Data
US 2019/0316842 A1 Oct. 17, 2019

(30) Foreign Application Priority Data

Dec. 21, 2016 (DE) ..................... 10 2016 125 060.0

(51) Int. Cl.
*F26B 25/06* (2006.01)
*F26B 21/10* (2006.01)
(Continued)

(52) U.S. Cl.
CPC ................ *F26B 21/10* (2013.01); *F26B 3/04* (2013.01); *F26B 15/14* (2013.01); *F26B 21/04* (2013.01);
(Continued)

(58) Field of Classification Search
CPC .......... F26B 21/10; F26B 21/04; F26B 21/12; F26B 3/04; F26B 15/14; F26B 23/002;
(Continued)

(56) References Cited

U.S. PATENT DOCUMENTS 3,832,429 A * 8/1974 Charpentier ............ B29C 44/26
264/51
6,935,052 B2 8/2005 Sonner et al.
(Continued)

FOREIGN PATENT DOCUMENTS

CN 12 339 75 C 12/2003
CN 101 970 965 A 2/2011
(Continued)

*Primary Examiner* — John P McCormack
(74) *Attorney, Agent, or Firm* — Schroeder Intellectual Property Law Group, LLC

(57) ABSTRACT

A device for controlling the temperature of, and in particular for drying, objects, in particular vehicle bodies, having a housing which integrates a temperature-control chamber that includes at least one air outlet and at least one air inlet. The temperature-control chamber is assigned at least one heating unit in which it is possible to generate a hot primary gas flow and to which it is possible to supply, from the air outlet, air that is to be heated. The heating unit includes a heat exchanger device into which the hot primary gas can be guided and in which it is possible to heat air from the temperature-control chamber using hot primary gas, which air can be supplied, as heated recirculation air, in a circuit via the at least one air inlet back to the temperature-control chamber. The heating unit includes at least a first and a second flow outlet via which heated recirculation air leaves the heating unit.

13 Claims, 7 Drawing Sheets

(51) Int. Cl.
*F26B 3/04* (2006.01)
*F26B 15/14* (2006.01)
*F26B 21/04* (2006.01)
*F26B 21/12* (2006.01)
*F26B 23/00* (2006.01)
*F26B 23/02* (2006.01)

(52) U.S. Cl.
CPC ............ *F26B 21/12* (2013.01); *F26B 23/002* (2013.01); *F26B 23/02* (2013.01); *F26B 2210/12* (2013.01)

(58) Field of Classification Search
CPC ...... F26B 23/02; F26B 2210/12; Y02P 70/10; B05D 3/0413
USPC .................................. 34/666, 201, 232, 235
See application file for complete search history.

(56) References Cited

U.S. PATENT DOCUMENTS

| | | | | |
|---|---|---|---|---|
| 8,732,980 | B2* | 5/2014 | Napfel | F26B 15/14 52/79.5 |
| 9,410,741 | B2 | 8/2016 | Katefidis | |
| 9,423,179 | B2 | 8/2016 | Wieland et al. | |
| 9,909,806 | B2 | 3/2018 | Schwerer et al. | |
| 9,958,204 | B2 | 5/2018 | Sluka et al. | |
| 10,060,676 | B2 | 8/2018 | Hihn | |
| 2004/0237339 | A1* | 12/2004 | Sonner | F26B 21/02 34/666 |
| 2007/0144036 | A1 | 6/2007 | Katefidis et al. | |
| 2011/0023314 | A1 | 2/2011 | Schwerer et al. | |
| 2013/0312277 | A1 | 11/2013 | Hihn | |
| 2014/0352169 | A1* | 12/2014 | Katefidis | F23D 14/24 34/666 |
| 2015/0121720 | A1* | 5/2015 | Wieland | F26B 21/10 34/493 |

FOREIGN PATENT DOCUMENTS

| | | |
|---|---|---|
| CN | 103 380 343 A | 10/2013 |
| CN | 104 583 699 A | 4/2015 |
| DE | 197 35 322 | 2/1999 |
| DE | 101 25 771 | 11/2002 |
| DE | 10 2008 012 792 | 9/2009 |
| DE | 10 2009 021 004 | 10/2010 |
| DE | 10 2010 006 550 | 8/2011 |
| DE | 10 2011 119 436 | 5/2013 |
| DE | 10 2012 007 769 | 10/2013 |
| DE | 10 2015 003 856 | 9/2016 |
| EP | 1 801 526 | 6/2007 |

* cited by examiner

DEVICE FOR CONTROLLING THE TEMPERATURE OF OBJECTS

RELATED APPLICATIONS

This application is a national phase of International Patent Application No. PCT/EP2017/081919 filed Dec. 7, 2017, which claims priority to German Patent Application No. 10 2016 125 060.0 filed Dec. 21, 2016—the contents of both of which are incorporated herein by reference.

FIELD OF THE INVENTION

The invention concerns a device for controlling the temperature of, in particular for drying, objects, in particular vehicle bodies, with
a) a housing in which a temperature-control chamber is housed that comprises at least one air outlet and at least one air inlet;
wherein
b) at least one heating unit, in which a hot primary gas flow can be generated and to which air to be heated can be supplied from the air outlet, is associated with the temperature-control chamber;
c) the heating unit comprises a heat exchanger device into which the hot primary gas can be passed and in which air from the temperature-control chamber is heated by hot primary gas, which can be returned to the temperature-control chamber again as heated recirculation air in a circuit via the at least one air inlet.

BACKGROUND OF THE INVENTION

In such systems that are known from the market, in particular freshly painted vehicle bodies are dried, but also parts of vehicle bodies or other objects. Such dryers are heated by, among other things, extracting air from the temperature-control chamber, which is usually embodied as a temperature-control tunnel, and mostly from sections of tunnel that are short compared to the total length of the temperature-control tunnel, heating the air in a heating unit using a heat exchanger and returning the air to the temperature-control tunnel or corresponding tunnel sections in a circuit.

SUMMARY OF THE INVENTION

It is the object of the invention to further develop a device of the kind mentioned at the beginning with a view to efficient energy recovery.

This object is achieved by a device of the type mentioned at the outset in that:
d) the heating unit comprises at least a first and a second flow outlet, via which heated recirculation air exits the heating unit.

With such a heating unit, two recirculation air flows with different energy levels can be generated, which can be fed to the temperature-control tunnel at different points. By means of the heating unit, the recirculation air is divided into at least two sub-flows. This allows the temperature profile in the temperature-control tunnel to be adapted more flexibly to changing conditions than is possible with conventional heating units, in which all the air heated in the heating unit is conveyed in the same circuit.

It is advantageous if the first and second flow outputs are each assigned a dedicated blower for conveying the circulation air.

It is advantageous if the heat exchanger device includes a first heat exchanger and a second heat exchanger, whereby air heated by means of the first heat exchanger exits the heating unit via the first flow output and air heated by means of the second heat exchanger exits the heating unit via the second flow output. In this way, the sub flows can be individually heated to their own temperatures.

This is even more effective when a separate burner with which primary gas can be produced for each heat exchanger is assigned to each heat exchanger of the heat exchanger device.

Another advantageous adjustment option is provided if primary gas that has passed through a heat exchanger flows out as burner exhaust air via a discharge port, wherein the outflow of the primary gas can be adjusted, preferably by means of a regulating flap.

Preferably, one or more temperature sensors are provided, by means of which the temperature of the air to be heated and/or the temperature of the heated air can be detected. In this way, a temperature profile in the temperature-control chamber can be specifically monitored and adjusted.

It is favorable if the temperature-control chamber is made up of several dryer modules, at least one of which is embodied as an aggregate module with a heating unit and at least one as a pressure chamber module with a pressure chamber, which is connected to at least one of the two flow outputs of the heating unit and from which heated air can flow into the temperature-control chamber.

It is particularly advantageous if the aggregate module works with two pressure chamber modules. A pressure chamber and via this a respective section of the temperature-control chamber can be fed with heated recirculated air from each provided flow output of the heating unit.

Favorable arrangements of the components are provided if the aggregate module on each side of the temperature-control chamber includes a heating unit or if the aggregate module on only one side of the temperature-control chamber includes a heating unit and/if the aggregate module includes a heating unit that is housed above the temperature-control chamber.

BRIEF DESCRIPTION OF THE DRAWINGS

Embodiments of the invention are described below in more detail using the drawings. In the figures.

DETAILED DESCRIPTION OF THE INVENTION

Figure 1:
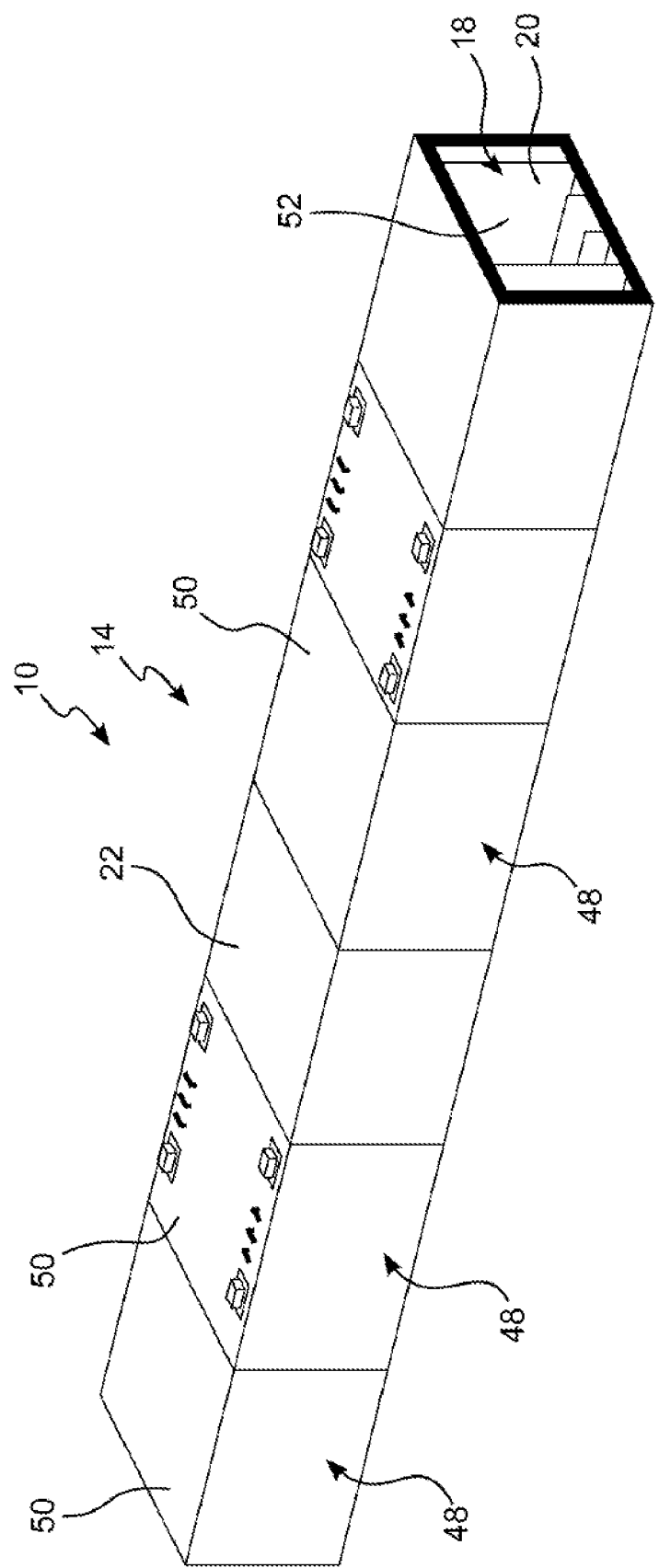
FIG. 1 shows schematically a perspective view of a dryer for drying objects, in which a drying chamber is defined by a drying tunnel constructed from a plurality of dryer modules in the form of aggregate modules and pressure chamber modules.
Figure 2:
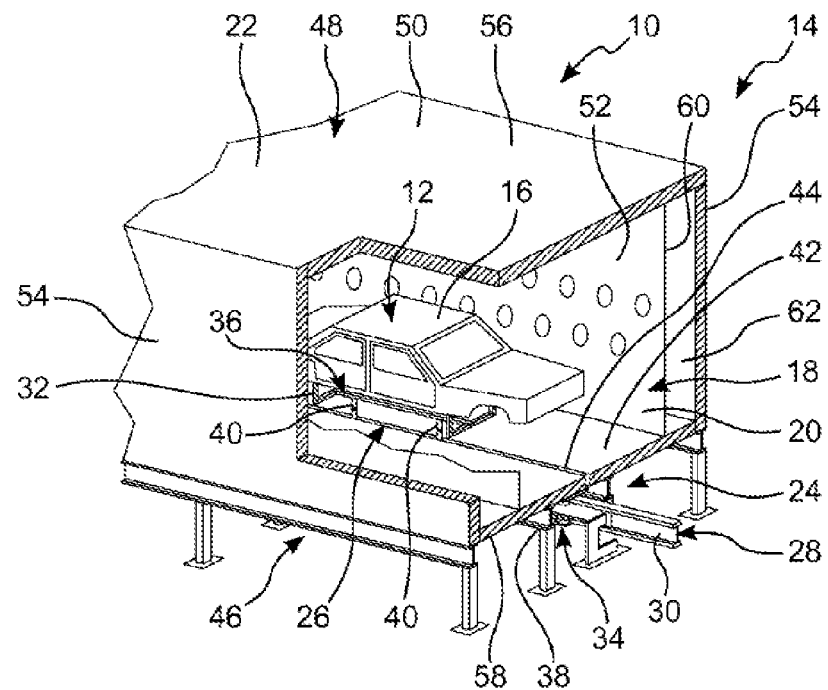
FIG. 2 shows a perspective view of a tunnel section in which a conveyor system is illustrated.
Figure 3:
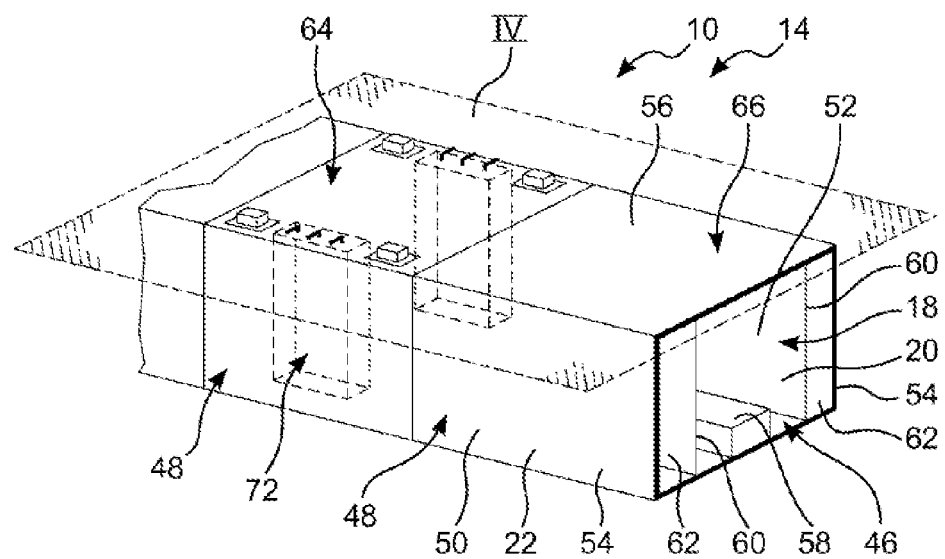
FIG. 3 shows a perspective view of a section of the dryer of FIG. 1, in which an aggregate module and a pressure chamber module are fully recognizable.

In FIG. 1 a temperature control device for controlling the temperature of workpieces 12 shown only in FIG. 2 is denoted as a whole by 10. A dryer 14 is shown as an example of such a temperature control device 10. As an example of workpieces 12, FIG. 2 shows a vehicle body 16; however, workpieces 12 can also be other workpieces, and in particular attachment parts or body parts of vehicle bodies 16 such as bumpers, side mirrors or similar. If necessary, smaller workpieces 12 can be disposed on a workpiece carrier that is not specifically shown.

In the exemplary embodiments according to FIGS. 1 through 13, the dryer 14 includes a temperature-control chamber 18 in the form of a drying tunnel 20, which is housed in a dryer housing 22. The dryer housing 22 is thermally insulated. The workpieces 12 to be dried are transported in the passage from a tunnel entrance to a tunnel exit, which are not shown in the figures.

For this purpose, the dryer 14 includes a transport system 24, with which workpieces 12 are transported through the drying chamber 18 and which is only illustrated in FIG. 2. The transport system 24 comprises a variety of transport carriages 26, of which only one can be seen in FIG. 2 and on which workpieces 12 are transported and which are conveyed on a rail system 28. The rail system 28 of the transport system 24 comprises a support rail 30, on which the transport carriage 26 travels and which is embodied in a well-known way as an I profile and is anchored to the ground. The supporting rail 30 attached to the ground is single track. Alternatively, there may be a multi-track, especially two-track rail system 28.

The transport carriage 26 includes a fastening device 32, to which a vehicle body 18 or a corresponding workpiece carrier for workpieces 12 can be attached. In the present exemplary embodiment, the fastening device 32 is designed to accommodate vehicle bodies 16. For this purpose, the fastening device 32 includes a supporting profile 34 with bearing bolts that cannot be identified in FIG. 2, which are known to cooperate with counter elements on the vehicle body 16 in a known manner, so that the vehicle body 16 can be fixed to the fastening device 32. The fastening device 32 can also comprise a plurality of sets of such bearing bolts, which are adapted to different vehicle bodies 16 with different dimensions and designs, so that the fastening device 32 can be flexibly used for different types of vehicle bodies.

The transport carriage 26 includes a transport carriage chassis 34, which runs on the support rail 30 and supports the fastening device 32. The transport carriage chassis 34 is coupled to the fastening device 32 by means of a connecting device 36. The coupling is set up in such a way that the transport carriage 26 is able to pass through curved sections of the support rail 30. For example, the transport carriage chassis 34 may include a leading unit and a trailing unit that are connected to each other in an articulated manner, with only a leading unit 36 partially recognizable in FIG. 2.

In the present exemplary embodiment, the connecting device 36 comprises two vertical linking struts 40 that couple the leading unit 38 and the trailing unit to the fastening device 32. The linking struts 38, 40 allow the fastening device 32 to be pivoted about a vertical rotation axis relative to the leading unit 32 and the trailing unit 34 by means of a joint that is not specifically marked.

The transport carriages 26 each carry their own drive system, so that the transport carriages 26 can be driven and operated independently. In addition to such transport carriages 26 with dedicated drive systems, other transport carriages may also be available that are driven by a central drive system. For example, such a central drive system can be formed by a chain arrangement or similar. Accordingly, transport carriages 26 that are described here can then also be driven and operated independently of other drive systems.

In the case of modifications that are not specifically shown here, other well-known transport systems may also be provided. For this purpose, for example, roller conveyors, chain conveyors, belt or band conveyors as well as rail systems or similar that are constructed in a different way from that described above are suitable, which can be operated intermittently or continuously.

As can be seen in FIG. 2, the drying tunnel 20 is bounded below by a tunnel floor 42. The tunnel floor 42 comprises a connecting passage 44 to the connecting device 36 of the transport carriage 26, which leads to a travelling space 46 for the transport carriage chassis 34 disposed below the drying tunnel 20, in which the rail system 30 is housed.

When a transport carriage 26 loaded with a workpiece 12 enters the dryer 14, the connecting device 36 of the transport carriage 26 is thus threaded, as it were, into the connecting passage 44 of the tunnel floor 42. When the workpieces 12 are then transported through the drying tunnel 20, the transport carriage chassis 34 moves in the travel space 46 and carries the fastening device 32 into the drying tunnel 20 with it, wherein the connecting device 36, i.e. in the present exemplary embodiment the linkage struts 40, extends through the connecting passage 44 into the tunnel floor 42.

As can be seen in FIG. 2, in the present exemplary embodiment the connecting passage 44 is designed as a vertical through-slot matching the vertical linkage struts 40. In this case, with suitable flow conditions the tunnel atmosphere can flow largely unhindered from the drying tunnel 20 through the connecting passage 44 into the travel space 46. In order to at least hinder such an outflow of the tunnel atmosphere from the drying tunnel 20, suitable sealing or shielding means may be provided.

The drying tunnel 20 is built up of several dryer modules 48 that comprise a module housing 50, each accommodating a module tunnel 52 and comprising side walls 54, a ceiling 56 and a module floor 58. The module tunnels 52 of the dryer modules 48 arranged one after the other form the drying tunnel 20 of the dryer 14, i.e. each module tunnel 52 of a dryer module 48 defines a section of the drying tunnel 20, wherein each module floor 58 acts as a section of the connecting passage 44 of the resulting tunnel floor 42. The dryer modules 48 are disposed within the cross-section of the dryer 14.

The module tunnel 52 is laterally bounded by intermediate walls 60, so that a working chamber 62 is formed between a side wall 54 of a module housing 50 and a respective intermediate wall 60.

A dryer module 48 can be pre-assembled as a construction unit in the present case, so that the dryer 14 can be assembled at its operating location by joining together the pre-assembled dryer modules 48. Alternatively, a dryer module 48 may only be formed when the dryer 14 is installed.

In the case of pre-assembled dryer modules 48, these are equipped with complementary connections for fluid lines and electrical lines, which must be available as resources for the operation of a dryer 14.

Figure 4:
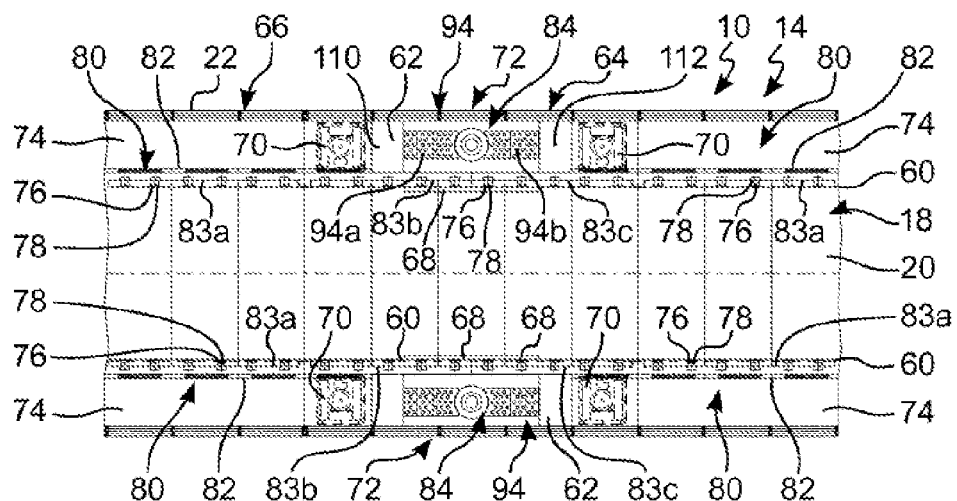
FIG. 4 shows a top view of the drying tunnel with a view of level IV in FIG. 3, wherein an aggregate module comprising a heating chamber with a heating unit on each side of the tunnel and two pressure chamber modules are shown, each with a pressure chamber on each side of the tunnel, via which air heated by a heating unit can be blown into the drying tunnel.

The dryer 14 works according to the well-known dryer concept, in which hot and pre-conditioned air from pressure chambers, which are housed in the dryer housing 22 on one or both sides of the drying tunnel 20, is blown into the drying tunnel 20. FIG. 4 shows an exemplary embodiment in which air is blown into the drying tunnel 20 from both sides.

In all the present exemplary embodiments, there are two types of dryer modules 48, which are available in the form of aggregate modules 64 and in the form of pressure chamber modules 66 on the other hand, which in turn are adapted to the chosen concept of blowing in; this will be made clearer below.

An aggregate module 64 comprises one or more air outlets 68 in the intermediate wall 60 thereof, via which tunnel air is sucked by at least one blower 70 into the working chamber 62 of the aggregate module 64, in which said tunnel air is heated by a heating unit 72 housed in the working chamber 62. Such a heating unit 72 is assigned to the temperature-control chamber, which is embodied here in the form of a drying tunnel 20.

The working chamber 62 of a pressure chamber module 66 forms a pressure chamber 74, into which said heated tunnel air flows and is returned to the drying tunnel 20 via one or more air inlets 76 in the intermediate wall 60 bounding the pressure chamber 74. In this way, tunnel air from the drying tunnel 20 is recirculated in a circuit and returned to the drying tunnel 20 as heated recirculation air. Said returned, heated recirculation air is directed, for example, to the items 12 to be dried via nozzles 78 disposed in the air inlets 76, and is usually heated to between about 80° C. and 220° C. Upstream of the air inlets 76, a filter device 80 that is shown in FIGS. 4, 11, 12 and 14 through which the heated tunnel air is filtered before its re-entry into the drying tunnel 20 and is rid of particles that are carried with it, is provided in the pressure chamber 74 of a pressure chamber module 66. In the exemplary embodiments shown here, said filter device 80 is embodied as a filter wall 82 with filter cartridges upstream of the air inlets 76 with the nozzles 78.

In this way, a flow chamber 83*a* is formed in the pressure chamber module 66 between the filter wall 82 and the intermediate wall 60. The working chamber 62 of the aggregate module 64 defines two such flow chambers 83*b* and 83*c* on the sides of each intermediate wall 60 facing away from the drying tunnel 20, in which air inlets 76 with nozzles 78 are also present. The flow chambers 83*b* and 83*c* are separated from each other in terms of flow by a partition that is not specifically provided with a reference character. The flow chamber 83*b* of the aggregate module 64 is connected to the flow chamber 83*a* of the pressure chamber module 66 on the left in FIG. 4 and the flow chamber 83*c* of the aggregate module 64 is connected to the flow chamber 83*a* of the pressure chamber module 66 on the right in FIG. 4. Thus, heated recirculation air can flow downstream of the filter walls 82 into the intermediate chambers 83*b*, 83*c* of the aggregate module 64 and from there into the drying tunnel. The intermediate chambers 83*a*, 83*b* and 83*c* are only provided with reference characters in FIG. 4.

If necessary, the air may also be moistened or dehumidified before re-entering the drying tunnel 20, for which well-known appropriate conditioning devices are provided. In addition, the air can also be mixed with conditioned fresh air before entering the drying tunnel 20. This, too, can be used to adjust the temperature of a recirculation air flow.

A heating unit 72 includes a burner device 84 with at least one burner 86 and an associated combustion chamber 88, which is used to generate a hot primary gas flow, for which a combustion gas and combustion air are conveyed to the heating unit 72 and the burner 86 in a well-known way. In FIGS. 6 through 10 and 13, the flowing tunnel air, i.e. both tunnel air to be heated from the drying tunnel 20 and heated tunnel air after flowing through the heating unit 72, are illustrated by arrows 90 and the flowing primary gas by arrows 92.

Primary gas produced in the heating unit 72 is fed into a heat exchanger device with one or more heat exchangers 94, where the air sucked into the working chamber 62 of the aggregate module 64 is heated by the hot primary gas 92.

In the present exemplary embodiments, such a heat exchanger 94 comprises a meander-shaped pipe system 96, into which the hot primary gas 92 flows via an input port 98 that is connected to the combustion chamber 88 of the burner 86. At the end of the pipe system 96 there is a discharge port 100, through which the primary gas 92 flows out as burner exhaust air, which may be discharged through the roof or is first subjected to further cleaning.

If there are correspondingly two discharge ports 100, through which the respective primary gas flows out as burner exhaust, said two burner exhaust flows, which may have different temperatures, can be conveyed merged or separated from each other for further use or discharged through the roof.

Figure 5:
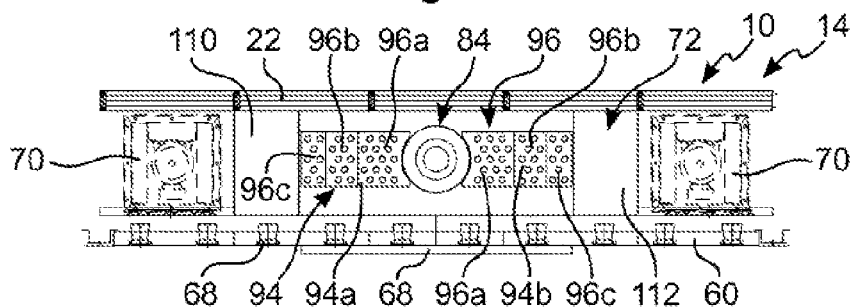
FIG. 5 shows a top view, corresponding to FIG. 4, of a heating chamber with a heating unit of the aggregate module on an enlarged scale.

As can be seen in FIGS. 4 and 5, the pipe system 96 includes a first section 96*a*, a second section 96*b* and a third section 96*c*, which are traversed consecutively by the hot primary gas on a meandering path. The flow cross-section of the first section 96*a* is larger than the flow cross-section of the second section 96*b*, which in turn is larger than the flow cross-section of the third section 96*c*. This takes into account the temperature of the primary gas 92, which is falling during the flow through the pipe system 96; the greatest transfer of heat to the tunnel air 90 takes place at the beginning of the pipe system 96. Due to the gradual cooling of the primary gas, its volume decreases over the flow path. Due to the changing cross-sections of sections 96*a*, 96*b*, 96*c*, its flow velocity remains constant.

In addition, such a heat exchanger 94 has a heat exchanger access 102 for tunnel air that is to be heated, through which the tunnel air to be heated can flow into the heat exchanger 94 and along the pipe system 96. The then heated tunnel air exits the heat exchanger 94 via a heat exchanger outlet 104.

In the present exemplary embodiments, a heating unit 72 has a first flow output 106 and a second flow output 108 via which the heated tunnel air 90 exits from the heating unit 72 and is output therefrom.

In this way, the basis is created to use the heating unit 72 to generate two recirculation air flows with different energy levels, which can be supplied to the drying tunnel 20 at different places. This allows the temperature profile in the drying tunnel 20 to be adapted more flexibly to changing conditions than is possible with conventional heating units.

In the exemplary embodiments shown here, a separate one of the above blowers 70 is assigned to each of the two flow outputs 106, 108, so that the volumetric flow of the heated tunnel air can be separately adjusted at each flow output 106, 108. The intake flow of the tunnel air through the air outlets 68 in the intermediate wall 60 of the aggregate module 64 results from the total power of the blowers 70.

The blowers 70 can be individually controlled by a control system that is not specifically shown. Said blowers are, for example, revolution rate-controlled blowers, which are controlled by a frequency control system.

In the exemplary embodiments shown in FIGS. 1 through 13, in the case of the aggregate module 64 the first flow output 106 is connected to the pressure chamber 74 of a first pressure chamber module 66 and the second flow output 108 is connected to the pressure chamber 74 of a second pressure chamber module 66, wherein the pressure chamber modules 66 are disposed upstream and downstream of the aggregate module 64.

Depending on the blower power of the blowers 70 at the flow outputs 106 and 108 of the heating unit 72, the associated pressure chambers 74 can be independently supplied with heated recirculation air, enabling the energy input into the drying tunnel 20 for each pressure chamber module 66 to be adjusted individually.

With modifications that are not specifically shown, the heating unit 72 can also include more flow outputs than the two flow outputs 106, 108; the above applies accordingly to a third and other such flow outputs, which can again each be equipped with their own blower.

In order to be able to adjust the individual inflow of the heated tunnel air into the drying tunnel 20 even more selectively, corresponding blowers can also be provided in the intermediate walls 60 of the pressure chamber modules 66. For example, instead of passive nozzles 78, active nozzles can also be present in the form of blowers, so that the volumetric flow of the heated recirculation air can be adjusted at any such active nozzle. Alternatively, the filter wall 82 can be equipped with appropriate blowers and, for example, one blower per filter cassette can be provided, so that groups of air inlets 76 or nozzles 78 can always be supplied with an individually adjustable recirculation air flow.

Figure 6:
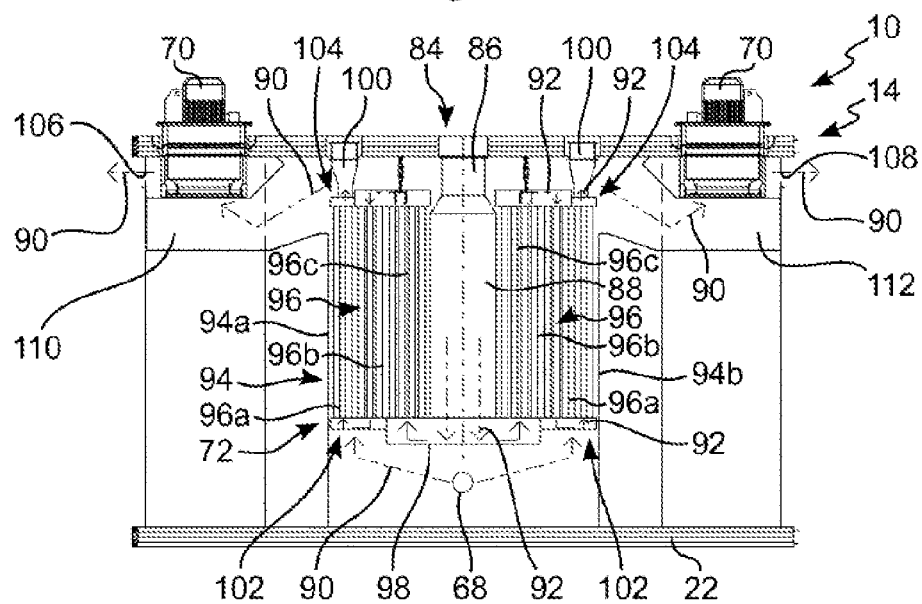
FIG. 6 shows a side view of the heating chamber with a heating unit.

In the exemplary embodiment shown in FIG. 6, the heating unit 72 includes a burner device 84 with a burner 86 and a combustion chamber 88 associated with said burner 86, as well as two heat exchangers 94, which are labeled 94a and 94b and both of which can be supplied with hot primary gas 92 from the one combustion chamber 88 that is present. Tunnel air heated in the first heat exchanger 94a exits the heating unit 72 through the first flow output 106 and tunnel air heated in the second heat exchanger 94b exits the heating unit 72 through the second flow output 108.

For this purpose, in the exemplary embodiments shown here the heat exchanger output 104 of the first heat exchanger 94a is connected to the first flow output 106 of the heating unit 72 via a first flow channel 110. The heat exchanger output 100 of the second heat exchanger 94b is connected to the second flow output 108 of the heating unit 72 via a second flow channel 112. Thus in this way, heated tunnel air 90 from the first heat exchanger 94a is output from the heating unit 72 via the first flow output 106 and the blower 70 thereof and heated tunnel air 90 from the second heat exchanger 94b is output from the heating unit 72 via the second flow output 108 and the blower 70 thereof.

Figure 7:
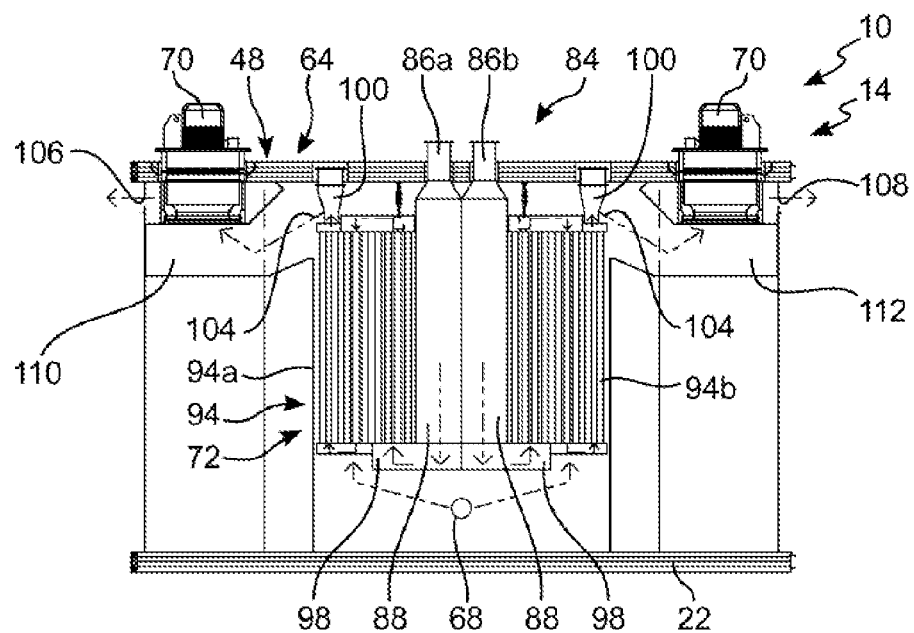
FIGS. 7 through 10 show side views, corresponding to FIG. 6, of the heating chamber with a modified heating unit.

The exemplary embodiment shown in FIG. 7 differs from this in that the heating unit 72 includes a burner device 84 with two burners 86 and one combustion chamber 88 each, wherein the first burner and the first combustion chamber are denoted by 86a and 88a respectively and the second burner with the second combustion chamber are denoted by 86b and 88b respectively. Combustion gas and combustion air are supplied separately to each burner 86a, 86b. There are also two heat exchangers 94a, 94b, wherein the first heat exchanger 94a receives primary gas from the first combustion chamber 88a and the second heat exchanger 94 receives primary gas from the second combustion chamber 88b.

Figure 8:
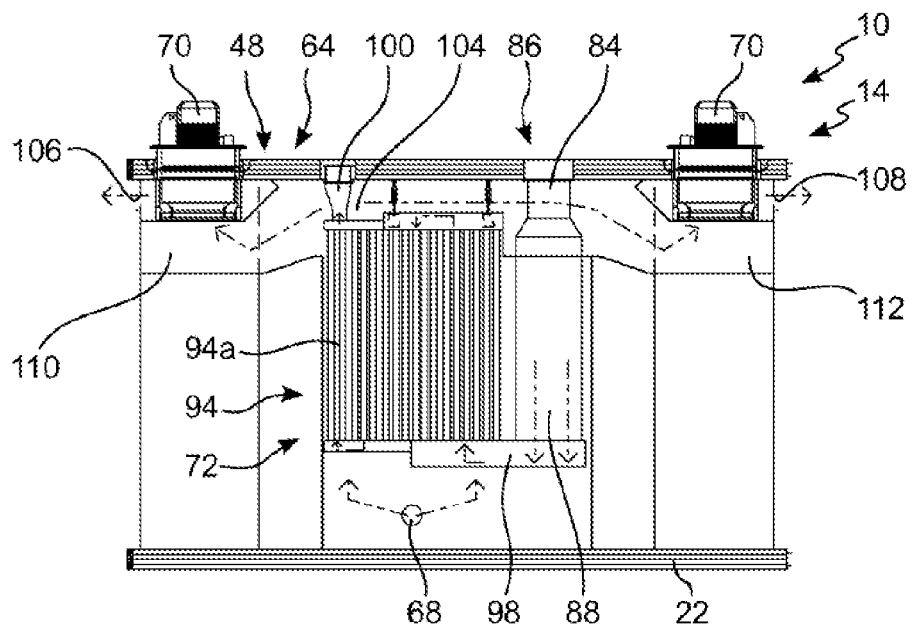

In the exemplary embodiment according to FIG. 8, the burner device 84 of the heating unit 72 again includes only one burner 86 with an associated combustion chamber 88. Instead of two heat exchangers 94a, 94b, the heat exchanger device 94 there comprises only a single heat exchanger 94a, the heat exchanger output 104 of which is connected to the two flow channels 110 and 112.

Figure 9:
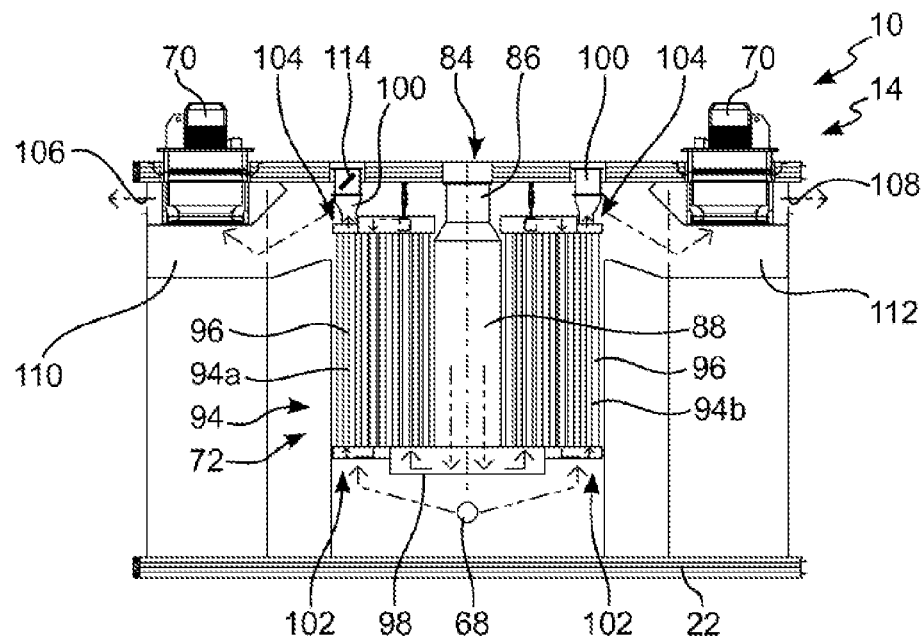

The exemplary embodiment according to FIG. 9 corresponds to the exemplary embodiment according to FIG. 6 with the only difference that the discharge port 100 of the first heat exchanger 94a comprises a regulating flap 114, by means of which the flow of the primary gas or the burner exhaust air from the first heat exchanger 94a can be adjusted.

Figure 10:
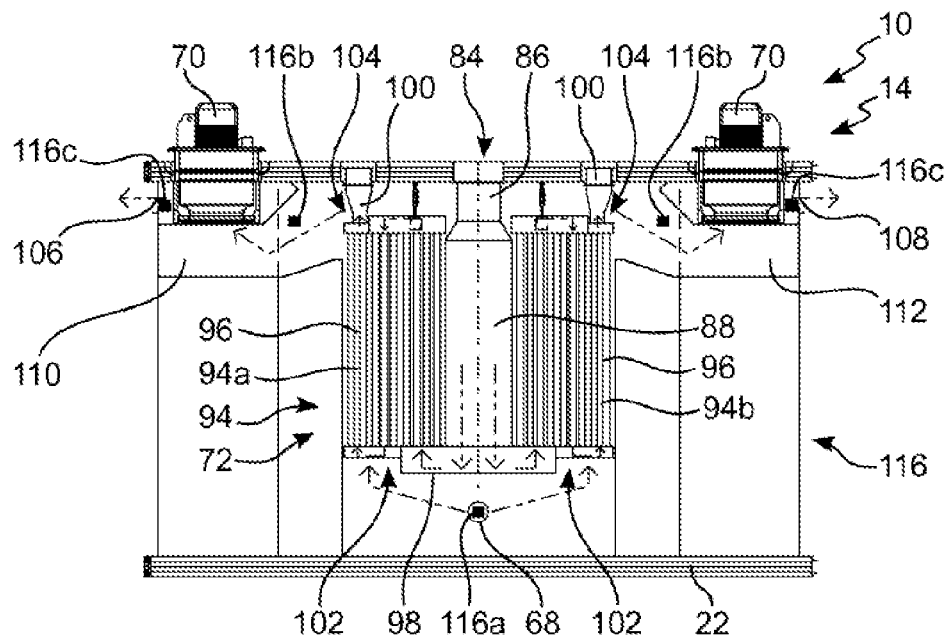

In the exemplary embodiment according to FIG. 10, a supplementary temperature sensor is available compared to the exemplary embodiment according to FIG. 6. There is a temperature sensor 116a to detect the temperature of the tunnel air that is to be heated flowing to the heat exchangers 94a, 94b. A further temperature sensor 116b is disposed in each of the flow channels 110 and 112 respectively to determine the temperature of the heated tunnel air after leaving the respective heat exchanger 94a, 94b. In addition, there is a temperature sensor 116c at each of the flow outputs 106 and 108, so that the temperature of the heated tunnel air can be determined when it leaves the heating unit 72.

All the temperature sensors 116a, 116b or 116c shown may be present, but it may be sufficient if only one or some of such temperature sensors 116a, 16b, 116c are provided. In the drying tunnel 20, alternatively or in addition to the temperature sensor 116, temperature sensors can be used with which the temperature of the tunnel air in the pressure chamber modules 66 can be measured.

Depending on the temperature data obtained in this way, the blowers 70, the regulating flaps that are provided or the burner power can be controlled in order to adjust or maintain the temperature profile in the drying tunnel 20.

In this way, the temperature zones in the drying tunnel 20 can be of finer resolution. Thus, differentiated temperature adjustments can be made in the longitudinal direction of the drying tunnel, but also in the lateral direction. Depending on the longitudinal extent of the pressure chamber modules 66, the temperature resolution can be adjusted in the longitudinal direction of the drying tunnel 20. Due to the short flow paths from the heating unit 72 to the air inlets 76 in the pressure chamber modules 66, desired temperature changes can be realized within short response times. This allows the drying tunnel 20 to be quickly adjusted for different consecutive workpieces 12. It is also possible that the temperature profile in the drying tunnel 20 can move along so to speak in the longitudinal direction in synchronism with the conveyed movement of the workpiece.

Figure 11:
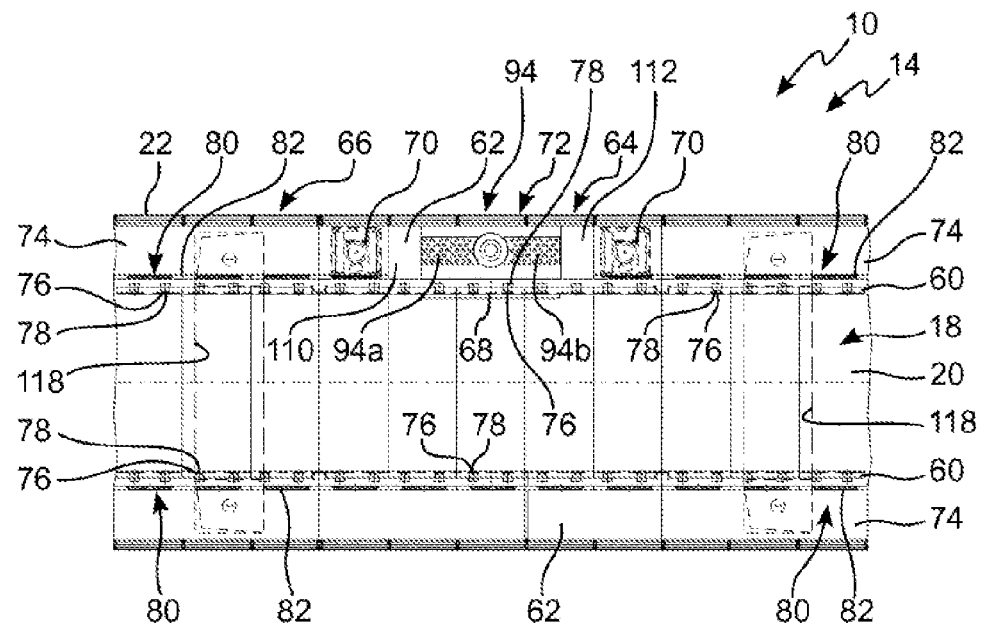
FIG. 11 shows a top view, corresponding to FIG. 4, of a second embodiment of the dryer, in which an aggregate module includes a heating chamber with a heating unit only on one tunnel side and a pressure chamber on the opposite side of the tunnel.

As described above, FIG. 4 shows a dryer 14 in which the aggregate module 64 has a heating unit 72 in each working chamber 62 on both sides of the drying tunnel 20. FIG. 11 illustrates a different concept in which an aggregate module 64 only accommodates a heating unit 72 in one of the two working chambers 62 on only one side of the drying tunnel 20, wherein the heated tunnel air 90 is nevertheless blown into the drying tunnel 20 from both sides. For this purpose, the two pressure chambers 74 of a pressure chamber module 66 have a flow connection to each other via a connecting channel 118, so that heated tunnel air 90, which initially flows from the aggregate module 64 into a pressure chamber 74 of a pressure chamber module 66, can pass from there via the connecting channel 118 to the second pressure chamber 74 on the other side of the drying tunnel 20 and can flow into it there.

The empty working chamber 62 of the aggregate module 64, which now does not house a heating unit 72, can serve as a pressure chamber 74 in this case if it is connected to at least one pressure chamber 74 of the neighboring pressure chamber module 66. In this case, the local intermediate wall 60 of the aggregate module 64 may be equipped with air inlets 76 and nozzles 78, as is the case with the intermediate walls 60 of the pressure chamber module 66.

Figure 12:
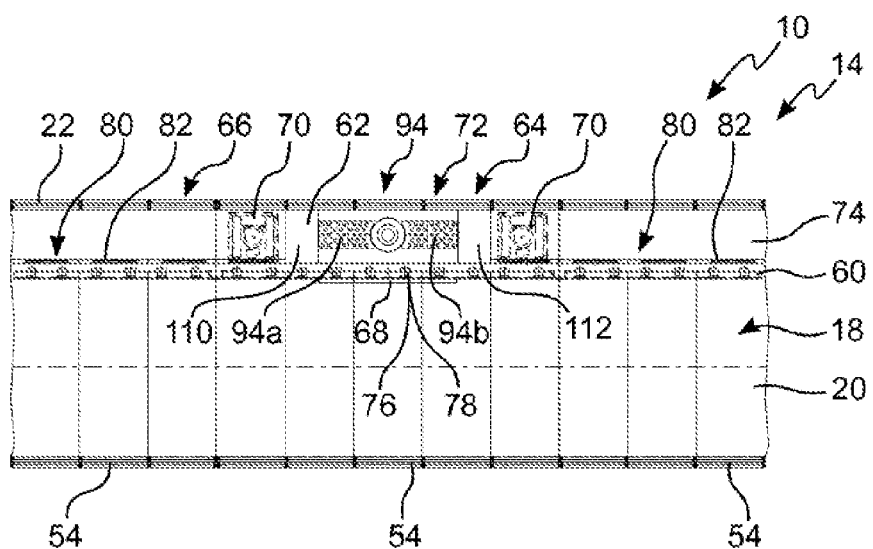
FIG. 12 shows a top view, corresponding to FIG. 4, of a third exemplary embodiment of the dryer, in which a heating chamber or a pressure chamber is provided on only one side of the aggregate module and the pressure chamber module.

In the exemplary embodiment according to FIG. 12, the dryer 14 follows a single-sided delivery concept. The dryer modules 48, i.e. the aggregate modules 64 and the pressure chamber modules 66 have only one working chamber 62 on one side of the drying tunnel 20, i.e. one working chamber 62 and one pressure chamber 74. In this case, the drying tunnel 20 is bounded by the dryer housing 22 on the opposite side of the working chamber 62; each module tunnel 52 is therefore bounded by the side wall 54 of the respective module housing 50.

Figure 13:
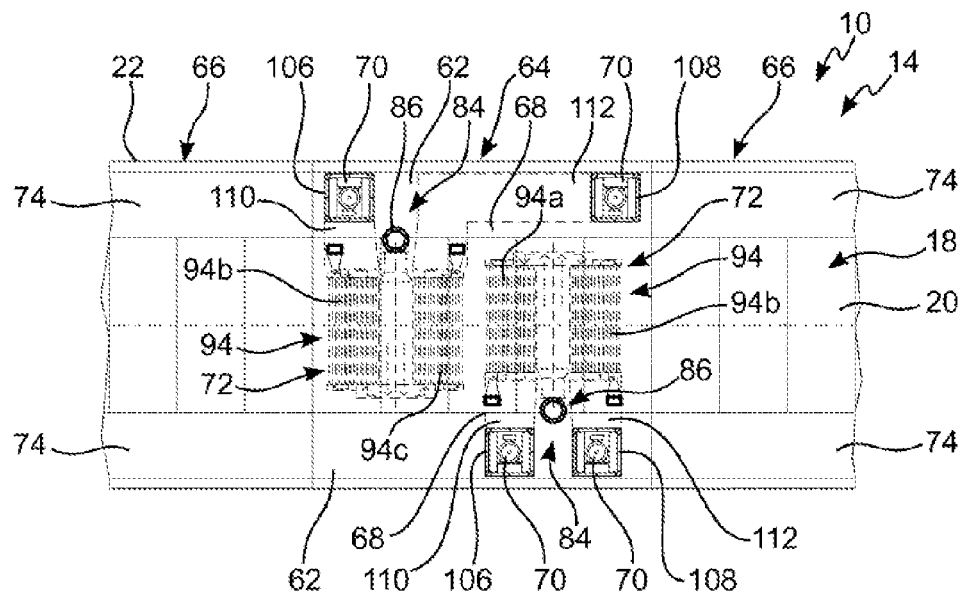
FIG. 13 shows a top view, corresponding to FIG. 4, of a fourth exemplary embodiment of the dryer, in which the heating units are disposed above level IV in FIG. 3.

FIG. 13 shows a modification in which working chambers 62 are again provided on both sides of the drying tunnel 22, but which serve as pressure chambers 74 for both the aggregate modules 64 and the pressure chamber modules 66. As can be seen in FIG. 13, the aggregate module 64 houses two heating units 72 above the ceiling 56 of the module tunnel 52, wherein heated tunnel air 90 is conveyed into the first working chamber 62 via one of the heating units 72 and via the other heating unit 72 into the second working chamber 62 of the aggregate module 64. From the working chambers 62 of the aggregate module 64, the heated tunnel air 90 then flows into the connected pressure chambers 74 of the adjacent pressure chamber modules 66 and from there into the drying tunnel 20 from both sides. The flow outputs 106, 108 of each heating unit 72 thus discharge the heated tunnel air downwards into the respective working chamber 62.

FIG. 13 illustrates different positions of the flow outputs 106 and 108 for the two heating units 72 that are present. For the heating unit 72 on the left in FIG. 13, the flow outputs 106 and 108 are disposed opposite each other on the end faces of the aggregate module 64, as in the embodiments described above. For the right-hand heating unit 72 in FIG. 13, the two flow outputs 106, 108 can each be found in comparison to be asymmetrically offset in the center direction. There, the heated tunnel air must therefore first flow through the working chamber below the heating unit 72 in order to enter the pressure chambers 74 of the pressure chamber modules 66 that are present on the right and left in FIG. 13.

As with all other exemplary embodiments, in the exemplary embodiment according to FIG. 13 the heating unit 72 is also disposed within the cross-section of the dryer 14 or within the cross-section defined by a dryer module 48.

Basically, heating units 72 disposed on the side of and above the drying chamber 18 are combined and can be integrated into an aggregate module 64.

Figure 14:
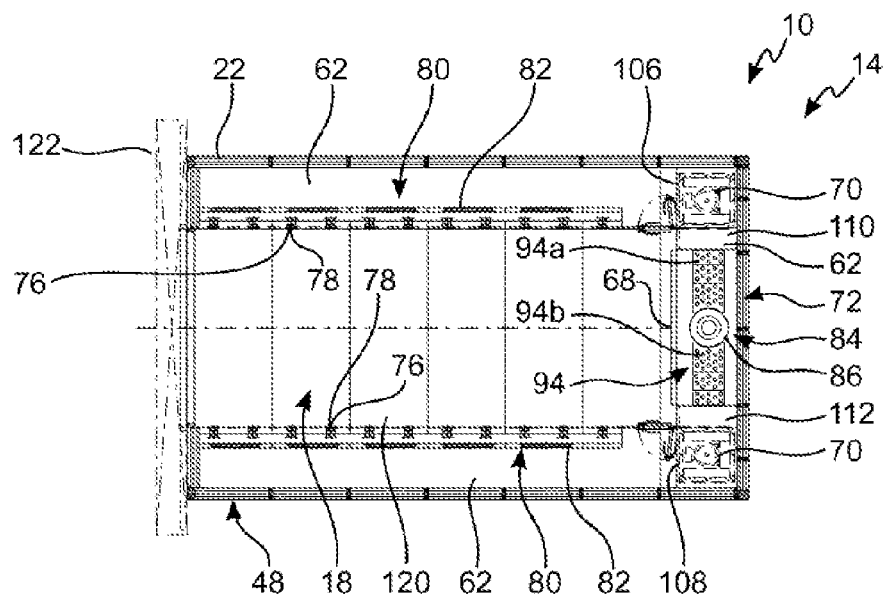
FIG. 14 shows a top view, corresponding to FIG. 4, of a modified dryer in which a drying space is defined by a drying chamber, whereby there is a heating unit on one side of the drying chamber and there are two pressure chambers on either side of the drying chamber.

FIG. 14 shows another exemplary embodiment of a dryer 14, in which a temperature-control chamber 18 is embodied not as a drying tunnel 20, but as a drying chamber 120, which can be closed by an entrance and exit gate 122. Such a drying chamber 120 can also be present in a dryer 14 in addition to a drying tunnel 20. The drying chamber 120 combines an aggregate module with a pressure chamber module 66 and has two opposite pressure chambers 74 and a working chamber 62 at the end on the side remote from the gate 122 in which the heating unit 72 is housed.

The exemplary embodiments described above reflect the conceptual structure of the dryer 14 of aggregate modules 64 and pressure chamber modules 66.

The interaction of the burner device 84 with the heat exchanger device 94 and with the blowers that are described above, in particular with the blowers 70, can be used at each flow exit 106, 108 to adjust the temperature of the heated tunnel air, i.e. the recirculation air, such that a certain heat input into the drying tunnel 20 can be caused in each pressure chamber module 66 at the air inlets 76.

By means of each heat exchanger 94a, 94b that is present, tunnel air that is to be heated can be heated individually, which is aided by the presence of a burner 86 for each heat exchanger 94a, 94b.

In relation to a previously defined reference heat input, correspondingly different heat input coefficients in the drying chamber 18 can be achieved at the air inlets 76, which also affect the heat input into the workpiece 12. A heat input coefficient of 1 means a heat input corresponding to the reference heat input as a result of the flow of heated tunnel air generated. A heat input coefficient <1 means a lower heat input, a heat input coefficient of >1 means a greater heat input than the reference heat input.

To summarize again, the following combinations can occur for the exemplary embodiments described above with always two blowers 70 and depending on the arrangement of the heating unit 72, when an aggregate module 64 is combined with two pressure chamber modules 66:

With the exemplary embodiment of FIG. 4, four different heat input coefficients can be achieved, one each at each of the four flow outputs 106, 108 and at the connected air inlets 76 in the pressure chamber modules 66.

Two different heat input coefficients can be achieved with the exemplary embodiment of FIG. 11. Approximately the same heat input coefficient can be achieved at the air inlets 76, which are connected to the first flow output 106 on the same side of the drying chamber 18 or via the connecting channel 118 on the opposite side of the drying chamber 18. Also, approximately the same heat input coefficient, but regardless of the first flow output 106, can be achieved at the air inlets 76, which are connected to the second flow output 108 on the same side of the drying chamber 18 or via the connecting channel 118 on the opposite side of the drying chamber 18.

With the exemplary embodiment according to FIG. 12, two different heat input coefficients can also be achieved, one at each of the two flow outputs 106, 108 and at the associated air inlets 76 in the pressure chamber modules 66.

With the exemplary embodiment according to FIG. 13, four different heat input coefficients can again be achieved, one each at each of the four flow outputs 106, 108 or at the associated air inlets 76 in the pressure chamber modules 66.

With the exemplary embodiment according to FIG. 14, two different heat input coefficients can again be achieved, one at each of the two flow outputs 106, 108 and at the associated air inlets 76 in the dryer module 48 shown there, which integrates an aggregate module 64 and a pressure chamber module 66.

The number of possible different heat input coefficients is multiplied according to the number of aggregate modules 64 and pressure chamber modules 66.

In principle, all the temperature-sensitive connections and connection points or other components of the parts involved are disposed outside the drying chamber 18, whereas non-temperature-sensitive elements can also be installed within the drying chamber 18.

What is claimed is:

1. A device for controlling the temperature of objects, comprising:
   a) a housing in which a temperature-control chamber is housed that includes at least one air outlet and at least one air inlet;
   wherein
   b) at least one heating unit, in which a hot primary gas flow can be generated and to which air to be heated can be supplied from the at least one air outlet, is associated with the temperature-control chamber;
   c) the at least one heating unit includes a heat exchanger device having two flow paths fed from the at least one air outlet and in which the air to be heated from the temperature-control chamber can be heated by the hot primary gas, the air being separately heated in each of the at least two flow paths and supplied to the temperature-control chamber as heated recirculation air in a circuit;
   d) the at least one heating unit includes at least a first flow output and a second flow output, wherein a first portion of heated recirculation air is heated in a first flow path of the at least two flow paths and exits the at least one heating unit through the first flow output and a second portion of heated recirculation air is heated in a second flow path of the at least two flow paths and exits the at least one heating unit through the second flow output, the first output and the second flow output each separately feeding the temperature-control chamber.

2. The device as claimed in claim 1, wherein the first and second flow output each has a dedicated blower for conveying the recirculation air.

3. The device as claimed in claim 1, wherein the first flow path is part of a first heat exchanger and the second flow path is part of a second heat exchanger, wherein air heated by means of the first heat exchanger exits the heating unit via the first flow output and air heated by means of the second heat exchanger exits the heating unit via the second flow output.

4. The device as claimed in claim 3, wherein a separate burner with which primary gas can be produced for each heat exchanger, is associated with each heat exchanger of the heat exchanger device.

5. The device as claimed in claim 1, wherein primary gas that has heated air in the first flow path or the second flow path flows out as burner exhaust air via a discharge port, wherein the flow of the primary gas can be adjusted.

6. A device as claimed in claim 1, wherein one or more temperature sensors are provided, by means of which the temperature of the air to be heated and/or the temperature of the heated air can be detected.

7. The device as claimed in claim 1, wherein the temperature-control chamber is constructed of a plurality of dryer modules, of which at least one dryer module is embodied as an aggregate module with a heating unit and at least one dryer module is a pressure chamber module with a pressure chamber, which is connected to at least one of the first flow output or the second flow output of the heating unit and from which heated air can flow into the temperature-control chamber.

8. The device as claimed in claim 7, wherein the aggregate module works with two pressure chamber modules.

9. The device as claimed in claim 7, wherein the aggregate module on each side of the temperature-control chamber includes a heating unit or that the aggregate module on only one side of the temperature-control chamber includes a heating unit or that the aggregate module includes a heating unit that is housed above the temperature-control chamber.

10. The device as claimed in claim 5, the primary gas is adjusted by a regulating flap.

11. The device as claimed in claim 1, wherein the first portion of the heated recirculation air from the heat exchanger device flows through a first pressure chamber before entering the temperature-control chamber, and the second portion of the heated recirculation air from the heat exchanger device flows through a second pressure chamber before entering the temperature-control chamber.

12. The device as claimed in claim 1, wherein the at least one heating unit includes one burner and one combustion chamber, wherein hot primary gas from the one combustion chamber is used to heat air in each of the first flow path and the second flow path.

13. The device as claimed in claim 1, wherein the at least one heating unit includes two burners, each burner having its own combustion chamber producing the hot primary gas, wherein air from the hot primary gas from the first combustion chamber is used to heat air in the first flow path and the hot primary gas from the second combustion chamber is used to heat air in the second flow path.

* * * * *